United States Patent
Nakano et al.

(10) Patent No.: US 6,676,736 B2
(45) Date of Patent: Jan. 13, 2004

(54) WATER-BASED INK COMPOSITION

(75) Inventors: Yukihiro Nakano, Wakayama (JP); Shigeki Nagashima, Wakayama (JP)

(73) Assignee: Kao Corporation, Tokyo (JP)

( * ) Notice: Subject to any disclaimer, the term of this patent is extended or adjusted under 35 U.S.C. 154(b) by 7 days.

(21) Appl. No.: 09/862,434

(22) Filed: May 23, 2001

(65) Prior Publication Data

US 2002/0002931 A1 Jan. 10, 2002

(30) Foreign Application Priority Data

May 23, 2000 (JP) ........................................ 2000-151981

(51) Int. Cl.$^7$ .............................................. C09D 11/00
(52) U.S. Cl. ................... 106/31.58; 106/31.86
(58) Field of Search ............................. 106/31.58, 31.86

(56) References Cited

U.S. PATENT DOCUMENTS

| | | | | |
|---|---|---|---|---|
| 4,680,332 A | * | 7/1987 | Hair et al. .................. | 524/377 |
| 4,986,850 A | | 1/1991 | Iwata et al. | |
| 5,085,698 A | * | 2/1992 | Ma et al. .................... | 524/388 |
| 5,169,437 A | | 12/1992 | You | |
| 5,180,425 A | | 1/1993 | Matrick et al. | |
| 5,356,464 A | | 10/1994 | Hickman et al. | |
| 5,852,074 A | | 12/1998 | Tsutsumi et al. | |
| 5,976,233 A | * | 11/1999 | Osumi et al. ............. | 106/31.86 |
| 5,998,501 A | | 12/1999 | Tsutsumi et al. | |
| 6,387,168 B1 | * | 5/2002 | Koitabashi et al. ........ | 106/31.6 |
| 2002/0043177 A1 | * | 4/2002 | Koitabashi et al. ...... | 106/31.27 |

FOREIGN PATENT DOCUMENTS

| | | |
|---|---|---|
| EP | 0 643 113 A1 | 3/1995 |
| GB | 2 303 376 A | 2/1997 |
| JP | A5710662 | 1/1982 |
| JP | A6032866 | 2/1985 |
| JP | A4239067 | 8/1992 |
| JP | 6-157955 a | 6/1994 |
| JP | 9-241565 A | 9/1997 |
| JP | 10-265710 A | 10/1998 |
| JP | 10-279873 A | 10/1998 |
| JP | 10-298294 A | 11/1998 |
| JP | 11-152424 A | 6/1999 |
| WO | WO 96/28518 A1 | 9/1996 |

* cited by examiner

*Primary Examiner*—Mark L. Bell
*Assistant Examiner*—Veronica F. Faison
(74) *Attorney, Agent, or Firm*—Birch, Stewart, Kolasch & Birch, LLP

(57) ABSTRACT

A water-based ink composition comprising (A) an aqueous medium; (B) at least one colorant selected from the group consisting of (i) polymer particles comprising a dye or pigment and a water-insoluble polymer, and (ii) a self-dispersible pigment; and (C) a specific compound A. The water-based ink composition is used for inkjet printing.

22 Claims, No Drawings

WATER-BASED INK COMPOSITION

BACKGROUND OF THE INVENTION

1. Field of the Invention

The present invention relates to a water-based ink composition, and more specifically to a water-based ink composition which can be used for a water-based ink for inkjet recording.

2. Discussion of the Related Art

Inkjet printing is carried out by directly jetting ink droplets from very fine nozzles, and depositing the ink droplets on a recording medium, to form characters or images. The inkjet printing is advantageous in that its printing device produces noise at a low level. Also, the inkjet printing is excellent in operability, facilitates coloration and enables to use plain paper as a recording medium. Therefore, the inkjet printing has been widely used in these years.

The inks used for inkjet printers include water-based ink, oil-based ink and solid ink. The water-based ink, constituting the majority of inks, contains water as a main component, and a colorant such as a dye or pigment dispersion, a moisturizing agent and a surfactant as an auxiliary for discharging ability and image quality. Japanese Patent Laid-Open No. Sho 60-32866 and Hei 4-239067 propose surfactants such as polyethylene glycol lauryl ether and polyoxyethylene nonylphenyl ether as an agent for improving drop directionality.

However, when the surfactant is added to the water-based ink in an amount sufficient for improving drop directionality, there arise some defects in that the water-based ink is spread along with fibers constituting paper, thereby resulting in lowering of printed quality and printed density.

An object of the present invention is to provide a water-based ink composition showing excellent water resistance and high-lighter fastness and high printed density, and more specifically a water-based ink composition having excellent discharging ability when the composition is used in a water-based ink for inkjet recording.

These and other objects of the present invention will be apparent from the following description.

SUMMARY OF THE INVENTION

According to the present invention, there is provided a water-based ink composition comprising:

(A) an aqueous medium;
(B) at least one colorant selected from the group consisting of (i) polymer particles comprising a dye or pigment and a water-insoluble polymer, and (ii) a self-dispersible pigment; and
(C) at least one compound A selected from the group consisting of a compound represented by the formula (I):

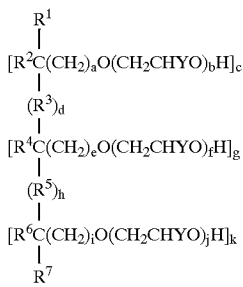

(I)

wherein each of $R^1$, $R^2$, $R^4$, $R^6$ and $R^7$ is independently hydrogen atom, $-C_nH_{2n+1}$, or $-C_nH_{2n}O(CH_2CHYO)_mH$, wherein Y is hydrogen atom or methyl group, m is a number of 0 to 20, and n is an integer of 1 to 6; each of $R^3$ and $R^5$ is independently a hetero atom, $-C_nH_{2n}-$, wherein n is as defined above, or a divalent hydrocarbon group which may have a hetero atom; each of a, e and i is independently 0 or 1; each of b, f and j is independently a number of 0 to 30; each of c, g and k is independently an integer of 1 to 5; and each of d and h is independently 0 or 1, with proviso that the total number of $-CH_2CHYO-$ units per molecule is 1 to 100;

a compound represented by the formula (II):

(II)

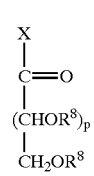

wherein $R^8$ is $-(CH_2CHYO)_k-$, wherein Y is as defined as above, and k is a number of 0 to 25; X is hydrogen atom, hydroxyl group, $-CH_2O(CH_2CHYO)_kH$, $-O(CH_2CHYO)_kH$, or $-OM$, wherein Y and k are as defined as above, and M is an alkali metal atom; and p is an integer of 2 to 7, with proviso that the total number of $-CH_2CHYO-$ units per molecule is 1 to 100; and a compound represented by the formula (III):

(III)

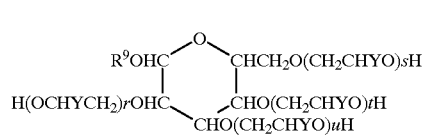

wherein $R^9$ is hydrogen atom or $-C_qH_{2q+1}$, wherein q is an integer of 0 to 4; Y is as defined above; each of r, s, t and u is independently a number of 0 to 30, with proviso that the total number of $-CH_2CHYO-$ units per molecule is 1 to 100.

DETAILED DESCRIPTION OF THE INVENTION

The aqueous medium comprises water, or a mixture of water and a water-soluble organic solvent excluding the above polyalkoxyalkylene derivative. As water, deionized water is usually employed. As the water-soluble organic solvent, there can be used ethylene glycol, propylene glycol, glycerol, and the like as disclosed in U.S. Pat. No. 5,085,698. A preferable mixture of water and the water-soluble organic solvent can be determined in accordance with surface tension, viscosity and printed quality required. Examples of the mixture of water and the water-soluble organic solvent include a mixture of an alkylene glycol having 2 to 6 carbon atoms and deionized water.

At least one compound A selected from the group consisting of a compound represented by the formula (I), a compound represented by the formula (II), and a compound represented by the formula (III) improves discharging ability and shows high printed density. In the compound represented by the formula (I), the hetero atom includes nitrogen atom, sulfur atom, oxygen atom, phosphorus atom, and the like.

Examples of the compound represented by the formula (I) include glycerol, diglycerol, triglycerol, tetraglycerol, trimethylolethane, trimethylolpropane, trimethylolbutane, 1,2,6-hexanetriol, 2-ethyl-2-(hydroxymethyl)-1,3-propanediol, 2-methyl-2-(hydroxymethyl)-1,3-propanediol, pentaerythritol, erythritol, D-threitol, L-threitol, DL-threitol, adonitol, D-arabitol, L-arabitol, xylitol, dulcitol, L-iditol, D-mannitol, D-sorbitol, their adducts with an alkylene oxide such as ethylene oxide and/or propylene oxide, and the like.

Examples of commercially available ones include Liponic REG-1 and Liponic RSO-20 commercially available from Lipo Chemicals Co.; Paterson, N.J., U.S.A.; Photonol RPHO-7149 and Photonol PHO-7155 commercially available from Henkel Corporation, Ambler; Pa., U.S.A.; Voronal R230-660 and Voronal R234-630 commercially available from Dow Chemical Co.; Midland, Mich., U.S.A.; Formred RT-315, Fomrez RET-190 and Fomrez RET-250 commercially available from Witco Corporation, Organics Division; New York, N.Y., U.S.A.; and the like.

Examples of the compound represented by the formula (II) include aldoses, ketoses, aldonic acids, soluble metal aldonates, polyalkoxyalkylene derivatives thereof, and the like. Specific examples thereof include D-erythrose, L-erythrose, threose, arabinose, ribose, lyxose, xylose, glucose, mannose, altrose, talose, galactose, idose, gulose, and corresponding aldonic acids, namely D-gluconic acid, D-mannonic acid, D-altronic acid, D-alloic acid; soluble metal aldonates such as potassium gluconate; their adducts with the alkylene oxide such as ethylene oxide and/or propylene oxide; and the like.

Examples of the compound represented by the formula (III) include alkylene oxide such as ethylene oxide and/or propylene oxide adducts of glucose, α-methylglucoside, and β-methyl-D-alloside.

Each of the compounds represented by the formulas (I) to (III) can be used alone or in admixture.

The total number of —CH$_2$CHYO— units in the compound A is 1 to 100. The total number of —CH$_2$CHYO— units is preferably 6 to 80, more preferably 10 to 40, from the viewpoints of discharging ability and printed density. It is preferable that the total number of —CH$_2$CHYO— units is not less than 1, from the viewpoints of obtaining excellent discharging ability and high printed density, which are characteristics in the present invention, and that the total number of —CH$_2$CHYO— units is not more than 100, from the viewpoint of giving a water-based ink composition appropriate viscosity.

In order to improve the discharging ability of the water-based ink composition, it is desired to use a compound A, the surface tension of which is 40 to 70 mN/m, preferably 50 to 70 mN/m in a 10% by weight aqueous solution.

The content of the compound A in the water-based ink composition is not limited to specified ones. It is desired that the content is 0.1 to 50% by weight, preferably 0.5 to 25% by weight, more preferably 1 to 10% by weight. It is preferable that the content of the compound A is not less than 0.1% by weight, from the viewpoint of giving a water-based ink composition a good balance of viscosity, discharging ability, and printed qualities such as printed density and sharpness in image quality, and that the content is not more than 50% by weight, from the viewpoint of giving a water-based ink composition appropriate viscosity.

For the purposes of further improving discharging ability and image quality, the water-based ink composition may contain at least one compound B selected from the group consisting of a compound represented by the formula (IV):

$$R^{10}O—(CH_2CHYO)_v—H \quad (IV)$$

wherein Y is as defined above; $R^{10}$ is hydrogen atom, or a saturated or unsaturated monovalent hydrocarbon group having 1 to 8 carbon atoms which may have a hetero atom; and v is a number of 1 to 100; a compound represented by the formula (V):

$$H(OCHYCH_2)_w—O—R^{11}O—(CH_2CHYO)_x—H \quad (V)$$

wherein Y is as defined above; $R^{11}$ is $C_yH_{2y+1}$ or a saturated or unsaturated divalent hydrocarbon group having 3 to 10 carbon atoms which may have a hetero atom, wherein y is an integer of 3 to 10; and each of w and x is independently a number of 1 to 99, with proviso that the total number of —CH$_2$CHYO— units per molecule is 2 to 100; and a compound represented by the formula (VI):

$$R^{12}—(OCHYCH_2)_w—O—R^{11}O—(CH_2CHYO)_x—H \quad (VI)$$

wherein $R^{11}$, Y, w and x are as defined above; and $R^{12}$ is a saturated or unsaturated monovalent hydrocarbon group having 1 to 8 carbon atoms which may have a hetero atom, with proviso that the total number of —CH$_2$CHYO— units per molecule is 1 to 100.

Examples of the compound represented by the formula (IV) include monomethoxy-, monoethoxy-, mono(iso)propoxy-, mono(iso)butoxy-, monophenoxyethylene oxide/propylene oxide copolymers (number of ethylene oxide units: 5 to 30, number of propylene oxide units: 0 to 5), and the like.

Examples of the compound represented by the formula (V) include ethylene oxide/propylene oxide copolymers (number of ethylene oxide units: 5 to 30, number of propylene oxide units: 0 to 5) of (iso)propylene glycol, di(iso)propylene glycol, (iso)butylene glycol, 1,3-phenylene glycol, and 1,4-phenylene glycol.

Examples of the compound represented by the formula (VI) include those obtained by etherifying an ethylene oxide/propylene oxide copolymer (number of ethylene oxide units: 5 to 30, number of propylene oxide units: 0 to 5) of (iso)propylene glycol, di(iso)propylene glycol, (iso)butylene glycol, 1,3-phenylene glycol or 1,4-phenylene glycol with methyl, ethyl, (iso)propyl, (iso)butyl or phenyl at its terminal; and the like.

In order to improve the discharging ability of the water-based ink composition, it is desired to use a compound B, the surface tension of which is 40 to 70 mN/m, preferably 50 to 70 mN/m in a 10% by weight aqueous solution.

The compound B gives a smaller effect of printed density than that of the compound A. However, when the compound B is mixed with the compound A, the discharging ability can be improved without the lowering of printed density in many cases. Therefore, it is preferable to use the compound A together with the compound B.

The content of the compound B in the water-based ink composition is not limited to specified ones. It is desired that the content is 0.1 to 50% by weight, preferably 0.5 to 25% by weight, more preferably 1 to 10% by weight. It is preferable that the content of the compound B is not less than 0.1% by weight, from the viewpoint of giving a water-based ink composition a good balance of viscosity, discharging ability, and printed qualities such as printed density and sharpness in image quality, and that the content is not more than 50% by weight, from the viewpoint of giving a water-based ink composition appropriate viscosity.

As the colorant, there can be used at least one member selected from the group consisting of (i) polymer particles comprising a dye or pigment and a water-insoluble polymer, and (ii) a self-dispersible pigment.

The polymer particles comprising a dye or pigment and a water-insoluble polymer are very effective for imparting water resistance and high-lighter fastness to printed matters, and the self-dispersible pigment is effective for increasing printed density. These colorants can be selected according to their purposes. Also, those colorants can be used in admixture.

The dye which can be contained in the polymer particles is not limited to specified ones. Among them, a hydrophobic dye is preferable. Examples of the hydrophobic dye include oil dyes, disperse dyes, basic dyes, and the like. Among them, the oil dyes and the disperse dyes are preferable, since they can be favorably contained in the polymer particles.

The oil dyes are not limited to specified ones. The oil dyes include, for instance, C. I. Solvent Black 3, 7, 27, 29, 34; C. I. Solvent Yellow 14, 16, 29, 56, 82; C. I. Solvent Red 1, 3, 8, 18, 24, 27, 43, 51, 72, 73; C. I. Solvent Violet 3; C.I. Solvent Blue 2, 11, 70; C. I. Solvent Green 3, 7; C. I. Solvent Orange 2, and the like.

The disperse dyes are not limited to specified ones. Preferred examples include C. I Disperse Yellow 5, 42, 54, 64, 79, 82, 83, 93, 99, 100, 119, 122, 124, 126, 160, 184:1, 186, 198, 199, 204, 224, 237; C. I. Disperse Orange 13, 29, 31:1, 33, 49, 54, 55, 66, 73, 118, 119, 163; C. I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, 368; C. I. Disperse Green 6:1, 9, and the like.

It is desired that the hydrophobic dye can be dissolved in an organic solvent in a concentration of not less than 2 g/L, preferably 20 to 500 g/L, from the viewpoint of efficiently encapsulating the hydrophobic dye into the polymer particles described below.

Also, the pigment which can be contained in the polymer particles is not limited to specified ones, and any kinds of known inorganic pigment or organic pigments can be used. Also, an extender can be used together with the pigment, as occasion demands. The inorganic pigment includes carbon black, metal oxides, metal sulfides, metal chlorides, and the like. Among them, carbon black is preferable for a black water-based ink composition. The carbon black includes furnace black, lamp black, acetylene black, channel black, and the like. The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments, and the like. The extender includes silica, calcium carbonate, talc, and the like.

The water-insoluble polymer used in the aqueous dispersion of polymer particles comprising a hydrophobic dye or pigment includes vinyl polymers, ester-based polymers, urethane-based polymers, and the like. Among these polymers, the vinyl polymers are preferable.

As the aqueous dispersion of the vinyl polymer particles, it is desirable to use an aqueous dispersion of vinyl polymer particles containing a pigment and a vinyl polymer prepared by copolymerizing a monomer mixture comprising (a) a monomer having a salt-forming group, (b) a macromer and (c) a monomer copolymerizable with the monomer having a salt-forming group and the macromer.

The component (a) includes cationic monomers, anionic monomers, and the like. Examples of the component (a) include those described in Japanese Patent Laid-Open No. Hei 9-286939, page 5, column 7, line 24 to column 8, line 29, and the like.

Representative examples of the cationic monomer include tertiary amine-containing unsaturated monomers, ammonium salt-containing unsaturated monomers, and the like. Among them, N,N-dimethylaminoethyl (meth)acrylate, N-(N',N'-dimethylaminopropyl) (meth)acrylamide and vinylpyrrolidone are preferable.

Representative examples of the anionic monomer include unsaturated carboxylic acid monomers, unsaturated sulfonic acid monomers, unsaturated phosphoric acid monomers, and the like. Among them, the unsaturated carboxylic acid monomers such as acrylic acid and methacrylic acid are preferable.

The component (b) includes macromers having a polymerizable unsaturated group and a number-average molecular weight of 500 to 100000, preferably 1000 to 10000. Among them, a silicone macromer represented by the formula (VIII):

$$X^1(Y^1)_{q_1}Si(R^{16})_{3-r_1}(Z^1)_{r_1} \qquad \text{(VIII)}$$

wherein $X^1$ is a polymerizable unsaturated group; $Y^1$ is a divalent group; each of $R^{16}$ is independently hydrogen atom, a lower alkyl group, an aryl group or an alkoxy group; $Z^1$ is a monovalent siloxane polymer residue having a number-average molecular weight of not less than 500; $q_1$ is 0 or 1; and r is an integer of 1 to 3,
and a styrenic macromer having a polymerizable functional group at one end are preferable.

The number-average molecular weight of the component (b) is determined by gel chromatography using polystyrene as a standard substance and chloroform containing 1 mmol/L of dodecyldimethylamine as a solvent.

The silicone macromer can be favorably used from the viewpoint of preventing scorching on printer heads of inkjet printers.

In the silicone macromer represented by the formula (VIII), $X^1$ includes a monovalent unsaturated hydrocarbon group having 2 to 6 carbon atoms, such as $CH_2=CH-$ group and $CH_2=C(CH_3)-$ group. $Y^1$ includes divalent groups such as $-COO-$ group, a $-COOC_{a_1}H_{2a_1}-$ group, wherein $a_1$ is an integer of 1 to 5, and phenylene group. Among them, $-COOC_3H_6-$ is preferable. $R^{16}$ includes hydrogen atom; a lower alkyl group having 1 to 5 carbon atoms, such as methyl group and ethyl group; an aryl group having 6 to 20 carbon atoms, such as phenyl group; an alkoxy group having 1 to 20 carbon atoms, such as methoxy group. Among them, methyl group is preferable. $Z^1$ is preferably a monovalent dimethylsiloxane polymer residue having a number-average molecular weight of 500 to 5000. $q_1$ is 0 or 1, and preferably 1. $r_1$ is an integer of 1 to 3, and preferably 1.

Representative examples of the silicone macromer include a silicone macromer represented by the formula (VIII-1):

$$CH_2=CR^{17}-COOC_3H_6-[Si(R^{18})_2-O]_{b1}-Si(R^{18})_3 \quad (VIII\text{-}1)$$

wherein $R^{17}$ is hydrogen atom or methyl group; each of $R^{18}$ is independently hydrogen atom or a lower alkyl group having 1 to 5 carbon atoms; and $b_1$, is a number of 5 to 60; a silicone macromer represented by the formula (VIII-2):

$$CH_2=CR^{17}-COO-[Si(R^{18})_2-O]_{b1}-Si(R^{18})_3 \quad (VIII\text{-}2)$$

wherein $R^{17}$, $R^{18}$ and $b_1$ are as defined above; a silicone macromer represented by the formula (VIII-3):

$$CH_2=CR^{17}-Ph-[Si(R^{18})_2-O]_{b1}-Si(R^{18})_3 \quad (VIII\text{-}3)$$

wherein Ph is phenylene group; and $R^{17}$, $R^{18}$ and $b_1$ are as defined above;
a silicone macromer represented by the formula (VIII-4):

$$CH_2=CR^{17}-COOC_3H_6-Si(OE)_3 \quad (VIII\text{-}4)$$

wherein $R^{17}$ is as defined above; E is an $-[Si(R^{17})_2O]_{c1}-Si(R^{17})_3$ group, wherein $R^{17}$ is as defined above; and $c_1$ is a number of 5 to 65;
and the like.

Among them, the silicone macromer represented by the formula (VIII-1) is preferable, and a silicone macromer represented by the formula (VIII-1a):

$$CH_2=C(CH_3)-COOC_3H_6-[Si(CH_3)_2-O]_{d1}-CH_3 \quad (VIII\text{-}1a)$$

wherein $d_1$ is a number of 8 to 40, is particularly preferable. Examples of the silicone macromer include a silicone macromer commercially available from CHISSO CORPORATION under the trade name of FM-0711, and the like.

The styrenic macromer can be favorably used, since the pigment can be sufficiently contained in the vinyl polymer.

The styrenic macromer includes styrene homopolymers having a polymerizable functional group at one end, and copolymers of styrene with other monomers. Among them, those having acryloyloxy group or methacryloyloxy group as a polymerizable functional group at one end are preferable. It is desired that the content of styrene in the copolymer is not less than 60% by weight, preferably not less than 70% by weight, since the pigment can be sufficiently contained in the vinyl polymer. The other monomer includes acrylonitrile, and the like.

The component (c) includes (meth)acrylates such as methyl (meth)acrylate, ethyl (meth)acrylate, (iso)propyl (meth)acrylate, (iso)butyl (meth)acrylate, tert-butyl (meth)acrylate, (iso)amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate; styrenic monomers such as styrene, vinyltoluene, 2-methylstyrene and chlorostyrene; and the like. These can be used alone or in admixture of at least two kinds. Incidentally, (iso- or tertiary-) and (iso) mentioned above include both cases where these groups are present and where they are absent. In the case where these groups are absent, each of the listed compounds has a normal form.

It is preferable that the component (c) contains a styrenic monomer from the viewpoint of giving a water-based ink composition improved printed density and high-lighter fastness. As the styrenic monomer, styrene and 2-methylstyrene are preferable. These styrenic monomers can be used alone or in admixture thereof. It is desired that the content of the styrenic monomer in the component (c) is 10 to 100% by weight, preferably 40 to 100% by weight, from the viewpoints of giving a water-based ink composition improved printed density and high-lighter fastness.

The monomer mixture may contain at least one monomer selected from the group consisting of (d) a hydroxyl group-containing monomer [hereinafter referred to as component (d)], and (e) a monomer represented by the formula (VII):

$$CH_2=C(R^{13})COO(R^{14}O)_{p1}R^{15} \quad (VII)$$

wherein $R^{13}$ is hydrogen atom or a lower alkyl group; $R^{14}$ is a divalent hydrocarbon group having 1 to 30 carbon atoms which may have a hetero atom; $R^{15}$ is hydrogen atom or a monovalent hydrocarbon group having 1 to 30 carbon atoms which may have a hetero atom; and $p_1$ is a number of 1 to 60 [hereinafter referred to as component (e)].

The component (d) includes 2-hydroxyethyl (meth)acrylate, 3-hydroxypropyl (meth)acrylate, polyethylene glycol(n=2 to 30) (meth)acrylate, poly(ethylene glycol(n=1 to 15)-propylene glycol(n=1 to 15)) (meth)acrylate, and the like. Among them, 2-hydroxyethyl (meth)acrylate is preferable.

The component (e) increases the jetting stability of the water-based ink composition of the present invention, and suppresses the generation of crookedness even when continuous printing is carried out.

In the formula (VII), $R^{13}$ is hydrogen atom or a lower alkyl group. The lower alkyl group includes an alkyl group having 1 to 4 carbon atoms.

$R^{14}$ is a divalent hydrocarbon group having 1 to 30 carbon atoms which may have a hetero atom. The hetero atom includes, for instance, nitrogen atom, oxygen atom, a halogen atom and sulfur atom.

Representative examples of $R^{14}$ include an aromatic ring having 6 to 30 carbon atoms which may have a substituent; a heterocyclic ring having 3 to 30 carbon atoms which may have a substituent; and an alkylene group having 1 to 30 carbon atoms which may have a substituent. These rings or groups can be used in admixture of at least two kinds. The substituent includes an aromatic ring having 6 to 29 carbon atoms, a heterocyclic ring having 3 to 29 carbon atoms, an alkyl group having 1 to 29 carbon atoms, halogen atoms, amino group, and the like.

Preferred examples of $R^{14}$ include a phenylene group which may have a substituent of 1 to 24 carbon atoms; an aliphatic alkylene group having 1 to 30 carbon atoms, preferably 1 to 20 carbon atoms; an aromatic ring-containing alkylene group having 7 to 30 carbon atoms; and a heterocyclic ring-containing alkylene group having 4 to 30 carbon atoms.

Preferred examples of the $R^{14}O$ group include an alkylene oxide group having 2 to 7 carbon atoms such as ethylene oxide group, (iso)propylene oxide group, tetramethylene oxide group, heptamethylene oxide group, hexamethylene oxide group and a combination thereof; and phenylene oxide group.

$R^{15}$ is a monovalent hydrocarbon group having 1 to 30 carbon atoms which may have a hetero atom. The hetero atom includes, for instance, nitrogen atom, oxygen atom and sulfur atom.

Representative examples of $R^{15}$ include an aromatic ring having 6 to 30 carbon atoms which may have a substituent; a heterocyclic ring having 3 to 30 carbon atoms which may have a substituent; or an alkyl group having 1 to 30 carbon atoms which may have a substituent. The substituent includes an aromatic ring having 6 to 29 carbon atoms, a heterocyclic ring having 4 to 29 carbon atoms, halogen atoms, amino group, and the like.

Preferred examples of $R^{15}$ include phenyl group, an aliphatic alkyl group having 1 to 30 carbon atoms, preferably 1 to 20 carbon atoms, an aromatic ring-containing alkyl group having 7 to 30 carbon atoms, and a heterocyclic ring-containing alkyl group having 4 to 30 carbon atoms.

More preferred examples of $R^{15}$ include alkyl groups having 1 to 6 carbon atoms, such as methyl group, ethyl group, (iso)propyl group, (iso)butyl group, (iso)pentyl group and (iso)hexyl group; phenyl group; and the like.

$p_1$ is a number of 1 to 60. p is preferably a number of 1 to 30.

Concrete examples of the component (e) include methoxypolyethylene glycol (1–30: showing the value of $p_1$ in the formula (VII), hereinafter referred to the same) (meth) acrylates, methoxypolytetramethylene glycol (1–30) (meth) acrylates, ethoxypolyethylene glycol (1–30) (meth) acrylates, (iso)propoxypolyethylene glycol (1–30) (meth) acrylates, butoxypolyethylene glycol (1–30) (meth) acrylates, methoxypolypropylene glycol (1–30) (meth) acrylates, methoxy(ethylene glycol-propylene glycol copolymer) (1–30, out of which ethylene glycol: 1–29) (meth)acrylates, and the like. Those monomers can be used alone or in admixture of at least two kinds. Among them, methoxypolyethylene glycol (1–30) (meth)acrylates are preferable. The term "(meth)acrylate" as referred to herein is intended to mean acrylate or methacrylate. Also, the term "(iso)propoxy" is intended to mean n-propoxy or isopropoxy.

It is desired that the content of the component (a) in the vinyl polymer is 1 to 50% by weight, preferably 2 to 40% by weight, from the viewpoint of dispersion stability of the dispersion obtained.

It is desired that the content of the component (b) in the vinyl polymer is 1 to 25% by weight, preferably 5 to 20% by weight, from the viewpoint of suppression of scorching on heater surface of inkjet printer, and stability.

It is desired that the content of the component (c) in the vinyl polymer is 5 to 93% by weight, preferably 10 to 80% by weight, from the viewpoint of suppression of scorching on heater surface of inkjet printer, and stability. When the component (c) comprising a styrenic monomer is used, the content of the component (c) in the vinyl polymer is preferably 10 to 60% by weight.

It is desired that the content of the component (d) in the vinyl polymer is 5 to 40% by weight, preferably 7 to 20% by weight, from the viewpoints of jetting stability and printed density. It is desired that the total content of the component (a) and the component (d) is 6 to 60% by weight, preferably 10 to 50% by weight, from the viewpoints of stability in water and water resistance.

It is desired that the content of the component (e) in the vinyl polymer is 5 to 50% by weight, preferably 10 to 40% by weight, from the viewpoints of jetting stability and dispersion stability.

It is preferable that the total content of the component (a) and the component (e) in the vinyl polymer is 6 to 75% by weight, from the viewpoints of dispersion stability in water and jetting stability.

In addition, it is desired that the total content of the component (a), the component (d) and the component (e) in the vinyl polymer is 6 to 60% by weight, preferably 7 to 50% by weight, from the viewpoints of dispersion stability in water and jetting stability.

The vinyl polymer can be prepared by copolymerizing the monomer mixture by means of a known polymerization method such as bulk polymerization, solution polymerization, suspension polymerization, or emulsion polymerization. Among these polymerization methods, solution polymerization method is preferable.

The solvent used in the solution polymerization method is preferably a polar organic solvent, and a water-miscible organic solvent can also be used by mixing with water. The organic solvent includes, for instance, an aliphatic alcohol having 1 to 3 carbon atoms, such as methanol, ethanol and propanol; ketones such as acetone and methyl ethyl ketone; esters such as ethyl acetate, and the like. Among them, methanol, ethanol, acetone, methyl ethyl ketone, or a liquid mixture thereof with water is preferable.

A radical polymerization initiator can be used during the polymerization. As the radical polymerization initiator, azo compounds such as 2,2'-azobisisobutyronitrile, 2,2'-azobis (2,4-dimethylvaleronitrile), dimethyl-2,2'-azobisbutyrate, 2,2'-azobis(2-methylbutyronitrile), and 1,1'-azobis(1-cyclohexanecarbonitrile) are preferable. In addition, organic peroxides such as tert-butyl peroxyoctoate, di-tert-butyl peroxide and dibenzoyl oxide can be used as a radical polymerization initiator.

It is preferable that the amount of the polymerization initiator is 0.001 to 5% by mol, particularly 0.01 to 2% by mol of the monomer mixture.

During the polymerization, a polymerization chain transfer agent can be used. Concrete examples of the polymerization chain transfer agent include mercaptans such as octyl mercaptan, n-dodecyl mercaptan, tert-dodecyl mercaptan, n-tetradecyl mercaptan and mercaptoethanol; xanthogenndisulfides such as dimethyl xanthogenndisulfide and diisopropyl xanthogenndisulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, diterpene, α-methylstyrene dimer, 9,10-dihydroanthracene, 1,4-dihydronaphthalene, indene and 1,4-cyclohexadiene; unsaturated heterocyclic compounds such as 2,5-dihydrofuran; and the like. Those can be used alone or in admixture of at least two kinds.

The conditions for polymerizing the monomer mixture differ depending upon kinds of the radical polymerization initiator, monomer and the solvent. It is preferable that the polymerization temperature is usually 30° to 100° C., preferably 50° to 80° C., and that the polymerization time period is usually 1 to 20 hours. In addition, it is preferable that the polymerization atmosphere is an inert gas such as nitrogen gas.

After termination of the polymerization reaction, the resulting copolymer can be isolated from the reaction solution by a known method such as re-precipitation or distilling off of the solvent. The copolymer can be purified by the removal of unreacted monomers and the like by the repeat of re-precipitation, membrane separation, chromatography or extraction.

It is preferable that the weight-average molecular weight of the polymer is 3000 to 100000, from the viewpoints of durability after printing and dispersion stability.

The aqueous dispersion of the polymer particles containing the hydrophobic dye can be prepared by a known emulsification process. For instance, the aqueous dispersion can be obtained by dissolving a polymer and a hydrophobic dye in an organic solvent, adding a neutralizing agent as occasion demands to ionize a salt-forming group in the polymer, adding water to the resulting mixture, thereafter emulsifying with a dispersion device or a sonication emulsifier as occasion demands, and distilling off the organic solvent to phase-invert to a water-based system.

In addition, as a process for preparing an aqueous dispersion of the polymer particles containing a pigment, it is preferable to employ a process comprising dissolving a polymer in an organic solvent; adding a pigment, water and a neutralizing agent, and a surfactant as occasion demands to the resulting solution; kneading the mixture to form a paste; thereafter diluting the resulting paste with water as occasion demands; and distilling off the organic solvent from the mixture to give an aqueous dispersion.

It is preferable that the amount of the hydrophobic dye or pigment in the polymer particles is 20 to 400 parts by weight, based on 100 parts by weight of solid contents of the polymer, from the viewpoints of printed density and facilitation of containing the hydrophobic dye or pigment into the polymer particles.

In addition, as an aqueous dispersion of pigments, a self-dispersible pigment can also be preferably used for the purpose of increasing printed density. The self-dispersible pigment includes, for instance, a self-dispersible carbon black commercially available from Cabot Corporation under the trade name of Cabo-Jet 200, in which of carbon black is dispersed and stabilized without a dispersant, and the like.

The polymer particles comprising a dye or pigment and a water-insoluble polymer are more preferable than the self-dispersible pigment from the viewpoints of water resistance and high-lighter fastness.

It is preferable that the particle diameters of the polymer particles comprising the dye or pigment and the self-dispersible pigment are 0.01 to 0.5 $\mu$m, from the viewpoint of dispersion stability.

The content of the colorant in the water-based ink composition is not limited to specified ones, as long as sufficient printed density can be obtained. It is desired that the content is usually 1 to 30% by weight, preferably 2 to 10% by weight, more preferably 4 to 8% by weight, from the viewpoints of giving a water-based ink composition sufficient jetting stability and printed density.

The water-based ink composition of the present invention may contain various kinds of known additives, for instance, a wetting agent such as a polyhydric alcohol, a dispersant, a defoaming agent, a mildewproof agent, a chelating agent, a pH adjusting agent, and the like.

EXAMPLES

Preparation Example (Colorant: Preparation of Aqueous Dispersion of Polymer Particles Containing Carbon Black)

(1) Preparation of Water-Insoluble Polymer (1-1) Preparation of Anionic Polymer Solution The atmosphere of a one-liter flask equipped with a mechanical stirrer, a thermometer, a nitrogen inlet tube, a reflux condenser and a dropping funnel was sufficiently replaced with nitrogen gas. Thereafter, the flask was charged with 11.2 g of styrene, 2.8 g of acrylic acid, 12.0 g of lauryl methacrylate, 4.0 g of methoxypolyethylene glycol (n=9) methacrylate, 4.0 g of a styrene macromer (commercially available from TOAGOSEI CO., LTD., under the trade name of "AS-6") and 0.4 g of mercaptoethanol, and the temperature was raised to 65° C.

Next, a mixed solution of 100.8 g of styrene, 25.2 g of acrylic acid, 108.0 g of lauryl methacrylate, 36.0 g of methoxypolyethylene glycol (n=9) methacrylate, 60.0 g of hydroxyethyl methacrylate, 36.0 g of a styrene macromer (commercially available from TOAGOSEI CO., LTD., under the trade name of "AS-6"), 3.6 g of mercaptoethanol, 2.4 g of azobisdimethylvaleronitrile and 18 g of methyl ethyl ketone was added dropwise to the flask over a period of 2.5 hours.

After the termination of the dropwise addition, a mixed solution of 0.8 g of azobisdimethylvaleronitrile and 18 g of methyl ethyl ketone was added dropwise to the flask over a period of 0.5 hours. After the mixture was matured at 65° C. for 1 hour, 0.8 g of azobisdimethylvaleronitrile was added thereto, and the mixture was matured for additional one hour.

After the termination of the reaction, 364 g of methyl ethyl ketone was added to the flask, to give 800 g of a polymer solution, the concentration of which was 50% by weight.

A part of the resulting copolymer solution was isolated by drying it at 105° C. for 2 hours under reduced pressure to remove the solvent. The weight-average molecular weight was determined by gel permeation chromatography using polystyrene as a standard substance, and chloroform containing 1 mmol/L of dodecyldimethylamine as a solvent. As a result, the weight-average molecular weight was 28000.

(1-2) Preparation of Cationic Polymer Solution

The atmosphere of a one-liter flask equipped with a mechanical stirrer, a thermometer, a nitrogen inlet tube, a reflux condenser and a dropping funnel was sufficiently replaced with nitrogen gas. Thereafter, the flask was charged with 50.0 g of styrene, 12.0 g of lauryl methacrylate, 40.0 g of N,N-dimethylaminoethyl methacrylate, 60.0 g of methoxypolyethylene glycol (n=4) methacrylate, 20.0 g of a styrene macromer (commercially available from TOAGOSEI CO., LTD., under the trade name of "AS-6") and 0.8 g of mercaptoethanol, and the temperature was raised to 65° C.

Next, a mixed solution of 40.0 g of styrene, 20.0 g of lauryl methacrylate, 60.0 g of N,N-dimethylaminoethyl methacrylate, 70.0 g of methoxypolyethylene glycol (n=4) methacrylate, 20.0 g of a styrene macromer (commercially available from TOAGOSEI CO., LTD., under the trade name of "AS-6"), 7.2 g of mercaptoethanol, 2.4 g of azobisdimethylvaleronitrile and 18 g of methyl ethyl ketone was added dropwise to the flask over a period of 2.5 hours.

After the termination of the dropwise addition, a mixed solution of 0.8 g of azobisdimethylvaleronitrile and 18 g of methyl ethyl ketone was added dropwise to the flask over a period of 0.5 hours. After the mixture was matured at 65° C. for 1 hour, 0.8 g of azobisdimethylvaleronitrile was added thereto, and the mixture was matured for additional one hour. After the termination of the reaction, 364 g of methyl ethyl ketone was added to the flask, to give 800 g of a polymer solution, the concentration of which was 50% by weight.

A part of the resulting copolymer solution was isolated by drying it at 105° C. for 2 hours under reduced pressure to remove the solvent. The weight-average molecular weight was determined by gel permeation chromatography using polystyrene as a standard substance, and tetrahydrofuran as a solvent. As a result, the weight-average molecular weight was 15000.

(2) Preparation of Aqueous Dispersion of Polymer Particles Containing Carbon Black (2-1) Preparation of Aqueous Dispersion of Polymer Particles Containing Anionic Carbon Black Twenty-eight grams of the polymer solution obtained in item (1-1) above, 20 g of carbon black (commercially available from Cabot Corporation, under the trade name of "Monarch 880"), 13.6 g of a 1 mol/L aqueous potassium hydroxide, 20 g of methyl ethyl ketone and 30 g of ion-exchanged water were sufficiently stirred. Thereafter, the mixture was kneaded 20 times using a triple roller mill (commercially available from NORITAKE CO., LIMITED, under the trade name of "NR-84A"), to give a paste.

The resulting paste was added to 200 g of ion-exchanged water, and the mixture was sufficiently stirred. Thereafter, methyl ethyl ketone and water were distilled off using an evaporator, to give 160 g of an aqueous dispersion of polymer particles containing anionic carbon black, the solid content of which was 20.0% by weight. The average particle diameter of the polymer particles was determined by using a COULTER N4 (trade name, commercially available from Coulter, Inc.). As a result, the average particle diameter was 110 nm.

(2-2) Preparation of Aqueous Dispersion of Polymer Particles Containing Cationic Carbon Black Twenty-eight grams of the polymer solution obtained in item (1-2) above, 16 g of carbon black (commercially available from Cabot Corporation, under the trade name of "Monarch 880"), 11.1 g of a 1 mol/L aqueous acetic acid, 20 g of methyl ethyl ketone and 30 g of ion-exchanged water were sufficiently stirred. Thereafter, the mixture was kneaded 20 times using a triple roller mill (commercially available from NORITAKE CO., LIMITED, under the trade name of "NR-84A"), to give a paste.

The resulting paste was added to 200 g of ion-exchanged water, and the mixture was sufficiently stirred. Thereafter, methyl ethyl ketone and water were distilled off using an evaporator, to give 160 g of an aqueous dispersion of polymer particles containing cationic carbon black, the solid content of which was 20.0% by weight. The average particle diameter of the polymer particles was determined by using a COULTER N4 (trade name, commercially available from Coulter, Inc.). As a result, the average particle diameter was 138 nm.

(3) Preparation of Aqueous Dispersion of Polymer Particles Containing Oil Black

Twenty grams of methyl ethyl ketone and 10 g of oil black (commercially available from Orient Chemical Co., Ltd., under the trade name of "Oil Black 860") as a hydrophobic dye were added to 28 g of the polymer solution obtained in item (1-1) above, and completely dissolved. Thereto was added 13.6 g of a 1 mol/L aqueous potassium hydroxide to neutralize the salt-forming group of the polymer. Two-hundred grams of ion-exchanged water was added to the neutralized solution, and the solution was stirred. The resulting mixture was dispersed with Microfluidizer (commercially available from Microfluidics International Corporation) for 30 minutes.

The resulting dispersion was concentrated by removing the organic solvent therefrom at 60° C. under reduced pressure, and further removing water, to give an aqueous dispersion of polymer particles containing oil black, the solid content of which was 20.0% by weight. The average particle diameter of the polymer particles was determined by using a COULTER N4 (trade name, commercially available from Coulter, Inc.). As a result, the average particle diameter was 82 nm.

Examples 1 to 4 and Comparative Examples 1 and 2

Preparation of Water-Based Ink Composition

There were mixed 10 g of 2-pyrrolidone, 4 g of glycerol, 8 g of a polyalkoxyalkylene derivative described below, 1 g of isopropanol and 47 g of ion-exchanged water. Thereafter, 30 g of the aqueous dispersion of the polymer particles containing anionic carbon black obtained in Preparation Example under the item (2-1) was added to the resulting liquid mixture with stirring. The resulting mixture was filtered with a membrane filter (commercially available from Fuji Photo Film Co., Ltd., under the trade name of "Disc Capsule CALC80") having an average pore diameter of 0.8 μm, to give a water-based ink composition.

Examples 5 to 8

There were mixed 10 g of 2-pyrrolidone, 4 g of glycerol, 4 g of a polyalkoxyalkylene derivative described below, 1 g of isopropanol and 51 g of ion-exchanged water. Thereafter, 30 g of the aqueous dispersion of the polymer particles containing cationic carbon black obtained in Preparation Example under the item (2-2) was added to the resulting liquid mixture with stirring. The resulting mixture was filtered with a membrane filter (commercially available from Fuji Photo Film Co., Ltd., under the trade name of "Disc Capsule CALC80") having an average pore diameter of 0.8 μm, to give a water-based ink composition.

Example 9

The same procedures as in Example 1 were carried out except that 20 g of an aqueous dispersion of a self-dispersible carbon black (commercially available from Cabot Corporation, under the trade name of "Cabo-Jet 200," concentration: 20% by weight) and 18 g of a polyalkoxyalkylene derivative described below were used in place of 30 g of the aqueous dispersion of the polymer particles containing anionic carbon black used in Example 1, to give a water-based ink composition.

Example 10

The same procedures as in Example 1 were carried out except that 30 g of aqueous dispersion of the polymer particles containing oil black prepared in item (3) above was used in place of 30 g of the aqueous dispersion of the polymer particles containing carbon black used in Example 1, to give a water-based ink composition.

In each of Examples and Comparative Examples, the polyalkoxyalkylene derivatives used in the water-based ink composition are as follows:

Example 1: EO/PO Adduct of diglycerol (number of EO units=18, number of PO units=2) [compound of the formula (I)]

Example 2: EO/PO Adduct of α-methylglucoside (number of EO units=20, number of PO units=3) [compound of the formula (II)]

Example 3: 6 g of EO Adduct of α-methylglucoside (number of EO units=25) [compound of the formula (III)]; and
2 g of EO Adduct of dipropylene glycol (number of EO units=22) [compound of the formula (IV)]

Example 4: 4 g of EO Adduct of pentaerythritol (number of EO units=8) [compound of the formula (I)]; and
4 g of EO Adduct of monophenoxypolyethylene oxide (number of EO units=23) [compound of the formula (IV)];

Example 5: EO/PO Adduct of pentaerythritol (number of EO units=25, number of PO units=3) [compound of the formula (I)];

Example 6: EO Adduct of trimethylolpropane (number of EO units=14) [compound of the formula (I)];

Example 7: EO/PO Adduct of D-erythrose (number of EO units=17, number of PO units=3) [compound of the formula (II)];

Example 8: EO Adduct of 1,3,5-pentatriol (number of EO units=20) [compound of the formula (I)];

Example 9: EO Adduct of triglycerol (number of EO units=25) [compound of the formula (I)];

Example 10: 4 g of EO Adduct of glycerol (number of EO units=18, number of PO units=3) [compound of the formula (I)]; and 4 g of EO Adduct of monobutoxypolyethylene oxide (number of EO units=22) [compound of the formula (IV)];

Comparative Example 1: no polyalkoxyalkylene derivative was used in the water-based ink composition;

Comparative Example 2: polyethylene glycol lauryl ether (number of ethylene oxide units=20, commercially available from Kao Corporation under the trade name of "EMULGEN 120")

Next, as the physical properties of the water-based ink compositions obtained in each of Examples and Comparative Examples, printed density, printability (discharging stability), water resistance and high-lighter fastness were evaluated in accordance with the following methods. The results are shown in Table 1.

Printed Density

An inkjet printer (commercially available from Hewlett Packard Co., under the trade name of "Desk Jet 720C") was filled with a water-based ink composition, and thereafter printing was carried out on plain paper (commercially available from Xerox Corporation, under the trade name of "Xerox® 4024 DP 201b. Paper"). The printed matter was dried at 25° C. for 3 hours, and thereafter the printed density was determined by using a Macbeth densitometer (commercially available from Macbeth Process Measurements Co., under the trade name of "RD918").

Printability (Discharging Stability)

Continuous printing was carried out using the same printer and plain paper as used in the evaluation of Printed Density mentioned above, to give 10 solid image-printed A4 sheets. Thereafter, a test document including characters, solid images and ruled lines was printed, to evaluate printability (discharging stability). The evaluation criteria are as follows:

(Evaluation Criteria)

⊚: Satisfactory in all of three items of sharp and clear characters, uniform solid images, and no crookedness of printed ruled lines
○: Almost satisfactory in three items of sharp and clear characters, uniform solid images, and no crookedness of printed ruled lines
Δ: Unsatisfactory in one of three items of sharp and clear characters, uniform solid images, and no crookedness of printed ruled lines
x: Unsatisfactory in at least two items of three items of sharp and clear characters, uniform solid images, and no crookedness of printed ruled lines

Water Resistance

Solid image printing was carried out by using the printer and the plain paper used in the evaluation of Printed Density mentioned above, and dried at 25° C. for 1 hour. The printed density of the specified printed portion of the obtained sample was determined, and thereafter the printed copy paper was immersed in stand-still water for 10 seconds, and the paper was lifted vertically therefrom. After air-drying the paper at 25° C. for 24 hours, the printed density of the same printed portion as that before immersion was measured, and the residual ratio was determined by the following equation:

$$[\text{Residual Ratio}] = \frac{[\text{Printed Density After Immersion}]}{[\text{Printed Density Before Immersion}]} \times 100$$

The water resistance was evaluated on the basis of the following evaluation criteria:

(Evaluation Criteria)

⊚: Residual ratio being not less than 95%
○: Residual ratio being not less than 90% and less than 95%
Δ: Residual ratio being not less than 70% and less than 90%
x: Residual ratio being less than 70%

High Lighter-Fastness

Text printing was carried out by using the printer and the plain paper used in the evaluation of Printed Density mentioned above, and after the plain paper was allowed to stand for 6 hours at 25° C., the extent of staining of the printed sample when traced with a commercially available aqueous fluorescent marker (commercially available from PILOT CORPORATION, under the trade name of "Spotliter") was observed with naked eyes, and the evaluation was made on the basis of the following evaluation criteria:

(Evaluation Criteria)

⊚: No staining such as rubbed stains was observed even when traced with a fluorescent marker.
○: Some rubbed stains which would cause no problems in practical uses were generated when traced with a fluorescent marker.
x: Generation of rubbed stains were observed when traced with a fluorescent marker, which was intolerable.

TABLE 1

| | Printed Density | Printability | Water Resistance | High-Lighter Resistance |
|---|---|---|---|---|
| Ex. No. | | | | |
| 1 | 1.44 | ⊚ | ⊚ | ○ |
| 2 | 1.45 | ○ | ⊚ | ○ |
| 3 | 1.42 | ⊚ | ⊚ | ⊚ |
| 4 | 1.43 | ⊚ | ⊚ | ⊚ |
| 5 | 1.45 | ⊚ | ⊚ | ○ |
| 6 | 1.42 | ○ | ⊚ | ⊚ |
| 7 | 1.44 | ⊚ | ⊚ | ○ |
| 8 | 1.43 | ⊚ | ⊚ | ○ |
| 9 | 1.54 | ⊚ | ○ | x |
| 10 | 1.40 | ○ | ⊚ | ⊚ |
| Comp. Ex. No. | | | | |
| 1 | 1.32 | Δ | ⊚ | ⊚ |
| 2 | 1.12 | x | Δ | ⊚ |

It can be seen from the results shown in Table 1 that each of the water-based ink compositions obtained in Examples 1 to 10 has high printed density and shows excellent printability, and that high water resistance and high lighter-fastness can be also satisfied when the polymer particles containing a dye or pigment which is not a self-dispersible pigment are used.

Since the water-based ink composition of the present invention exhibits excellent water resistance and high lighter-fastness and high printed density, the water-based ink composition shows excellent printability (discharging stability) when the water-based ink composition is used in a water-based ink for inkjet recording.

What is claimed is:

1. A water-based ink composition comprising:

(A) an aqueous medium;

(B) at least one colorant selected from the group consisting of (i) polymer particles comprising a dye or pigment and a water-insoluble polymer, and (ii) a self-dispersible pigment;

(C) at least one compound A selected from the group consisting of a compound represented by the formula (I):

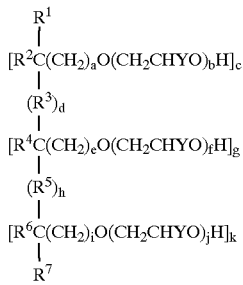

wherein each of $R^1$, $R^2$, $R^4$, $R^6$ and $R^7$ is independently a hydrogen atom, $—C_nH_{2+1}$, or $—C_nH_{2n}O(CH_2CHYO)_mH$, wherein Y is a hydrogen atom or methyl group, m is a number of 0 to 20, and n is an integer of 1 to 6; each of $R^3$ and $R^5$ is independently a hetero atom, $—C_nH_{2n}—$, wherein n is as defined above, or a divalent hydrocarbon group which may have a hetero atom; each of a, e and i is independently 0 o 1; each of b, f and j is independently a number of 0 to 30; each of c, g, and k is independently an integer of 1 to 5; and each of d and h is independently 0 or 1, with the proviso that the total number of —CH$_2$CHYO— units per molecule is 1 to 100;

a compound represented by the formula (II):

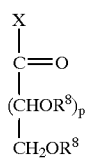

wherein $R^8$ is $—(CH_2CHYO)_k—$, wherein Y is as defined above, and k is a number of 0 to 25; X is a hydrogen atom, a hydroxyl group, $CH_2O(CH_2CHYO)_kH$, $—O(CH_2CHYO)_kH$, or $—OM$, wherein Y and k are as defined above, and M is an alkali metal atom; and p is an integer of 2 to 7, with the proviso that the total number of —CH$_2$CHYO— units per molecule is 1 to 100; and a compound represented by the formula (III):

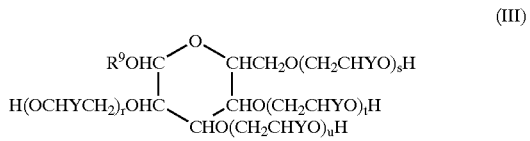

wherein $R^9$ is a hydrogen atom or $—C_qH_{2q+1}$, wherein q is an integer of 0 to 4; Y is as defined above; each of r, s, t and u is independently a number of 0 to 30, with the proviso that the total number of —CH$_2$CHYO— units per molecule is 1 to 100; and (D) at least one compound B selected from the group consisting of a compound represented by the formula (IV):

wherein Y is as defined above; $R^{10}$ is a hydrogen atom, or a saturated or an unsaturated monovalent hydrocarbon group having 1 to 8 carbon atoms which may have a hetero atom; and v is a number of 1 to 100;

a compound represented by the formula (V):

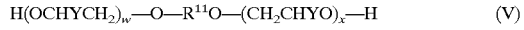

wherein Y is as defined above; $R^{11}$ is $C_yH_{2+1}$ or a saturated or an unsaturated divalent hydrocarbon group having 3 to 10 carbon atoms which may have a hetero atom, wherein y is an integer of 3 to 10; and each of w and x is independently a number of 1 to 99, with the proviso that the total number of —CH$_2$CHYO— units per molecule is 2 to 100; and a compound represented by the formula (VI):

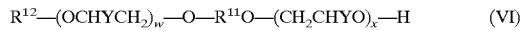

wherein $R^{11}$, Y, w and x are as defined above; and $R^{12}$ is a saturated or an unsaturated monovalent hydrocarbon group having 1 to 8 carbon atoms which may have a hetero atom, with the proviso that the total number of —CH$_2$CHYO— units per molecule is 1 to 100.

2. The water-based ink composition according to claim 1, wherein the colorant is polymer particles comprising a dye or pigment and a water-insoluble polymer.

3. The water-based ink composition according to claim 1, wherein the compound A has a surface tension of 40 to 70 mN/m.

4. The water-based ink composition according to claim 1, wherein the content of the compound A is 0.1 to 50% by weight.

5. The water-based ink composition according to claim 1, wherein the compound B has a surface tension of 40 to 70 mN/m.

6. The water-based ink composition according to claim 1, wherein the content of the compound B is 0.1 to 50% by weight.

7. The water-based ink composition according to claim 1, wherein the water-insoluble polymer comprises an aqueous dispersion of vinyl polymer particles comprising a pigment and a vinyl polymer prepared by copolymerizing a monomer mixture comprising (a) a monomer having a salt-forming group, (b) a macromer and (c) a monomer copolymerizable with the monomer having a salt-forming group and the macromer.

8. The water-based ink composition according to claim 7, wherein the monomer mixture further comprises at least one monomer selected from the group consisting of (d) a hydroxyl group-containing monomer, and (e) a monomer represented by the formula (VII):

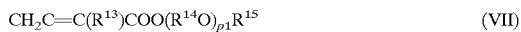

$$CH_2\!=\!C(R^{13})COO(R^{14}O)_{p1}R^{15} \qquad (VII)$$

wherein $R^{13}$ is hydrogen atom or methyl group; $R^{14}$ is a divalent hydrocarbon group having 1 to 30 carbon atoms which may have a hetero atom; $R^{15}$ is hydrogen atom or a monovalent hydrocarbon group having 1 to 30 carbon atoms which may have a hetero atom; and p1 is an integer of 1 to 60.

9. A water-based ink composition comprising
   (A) an aqueous medium;
   (B) polymer particles comprising a dye or pigment and a water-insoluble polymer as a colorant; and
   (C) at least one compound A selected from the group consisting of a compound represented by formula (I):

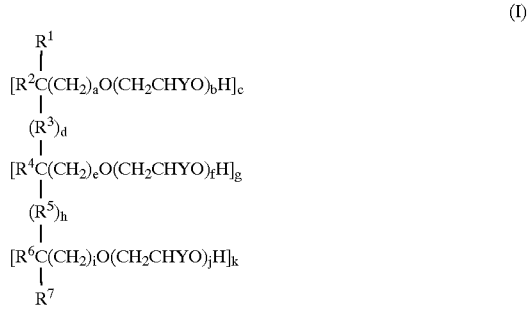

wherein each of $R^1$, $R^2$, $R^4$, $R^6$ and $R^7$ is independently a hydrogen atom, $-C_nH_{2n+1}$, or $-C_nH_{2n}O(CH_2CHYO)_mH$, wherein Y is a hydrogen atom or methyl group, m is a number of 0 to 20, and n is an integer of 1 to 6; each of $R^3$ and $R^5$ is independently a heteroatom, $-C_nH_{2n}-$, wherein n is as defined above, or a divalent hydrocarbon group which may have a heteroatom; each of a, e and i is independently 0 to 1; each of b, f and j is independently a number of 0 to 30; each of c, g, and k is independently an integer of 1 to 5; and each of d and h is independently 0 or 1, with the proviso that the total number of $-CH_2CHYO-$ units per molecule is 1 to 100,
and a compound represented by formula (III):

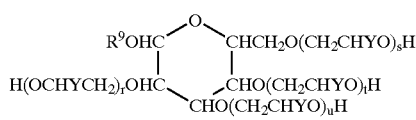

wherein $R^9$ is a hydrogen atom or $-C_qH_{2q+1}$, wherein q is an integer of 0 to 4; Y is as defined above; each of r, s, t and u is independently a number of 0 to 30, with the proviso that the total number of $-CH_2CHYO-$ units per molecule is 6 to 80.

10. The water-based ink composition according to claim 9, wherein the water-insoluble polymer comprises an aqueous dispersion of vinyl polymer particles comprising a pigment an a vinyl polymer prepared by copolymerizing a monomer mixture comprising (a) a monomer having a salt-forming group, (b) a macromer an (c) a monomer copolymerizable with the monomer having a salt-forming group and the the macromer.

11. The water-based ink composition according to claim 10, wherein the monomer mixture further comprises at least one monomer selected from the group consisting of (d) a hydroxyl group-containing monomer, and (e) a monomer represented by formula (VII):

$$CH_2\!=\!C(R^{13})COO(R^{14}O)_{p1}R^{15} \qquad (VII)$$

wherein $R^{13}$ is a hydrogen atom or methyl group; $R^{14}$ is a divalent hydrocarbon group having 1 to 30 carbon atoms which may have a hetero atom; $R^{15}$ is a hydrogen atom or a monovalent hydrocarbon group having 1 to 30 carbon atoms which may have a hetero at m; and p1 is an integer of 1 to 60.

12. The water-based ink composition according to claim 9, wherein the compound A has a surface tension of 40 to 70 mN/m.

13. The water-based ink composition according to claim 9, wherein the content of compound A is 0.1 to 50% by weight.

14. The water-based ink composition according to claim 9, wherein the water-based ink composition further comprises at least one compound B selected from the group consisting of a compound represented by the formula (IV):

$$R^{10}O-(CH_2CHYO)_v-H \qquad (IV)$$

wherein Y is as defined above; $R^{10}$ is a hydrogen atom, or a saturated or an unsaturated monovalent hydrocarbon group having 1 to 8 carbon atoms which may have a hetero atom; and v is a number of 1 to 100; a compound represented by the formula (V):

$$H(OCHYCH_2)_w-O-R^{11}O-(CH_2CHYO)_x-H \qquad (V)$$

wherein Y is as defined above; $R^{11}$ is $C_yH_{2y+1}$ or a saturated or an unsaturated divalent hydrocarbon group having 3 to 10 carbon atoms which may have a hetero atom, wherein y is an integer of 3 to 10; and each of w and x is independently a number of 1 to 99, with the proviso that the total number of $-CH_2CHYO-$ units per molecule is 2 to 100; and a compound represented by the formula (VI):

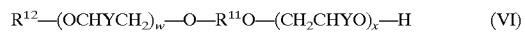

$$R^{12}-(OCHYCH_2)_w-O-R^{11}O-(CH_2CHYO)_x-H \qquad (VI)$$

wherein $R^{11}$, Y, w and x are as defined above; and $R^{12}$ is a saturated or an unsaturated monovalent hydrocarbon group having 1 to 8 carbon atoms which may have a heteroatom, with the proviso that the total number of $-CH_2CHYO-$ units per molecule is 1 to 100.

15. The water-based ink composition according to claim 9, wherein the compound B has a surface tension of 40 to 70 mN/m.

16. The water-based ink composition according to claim 9, wherein the content of compound B is 0.1 to 50% by weight.

17. A water-based ink composition comprising:
   (A) an aqueous medium;
   (B) a self-dispersible pigment as a colorant; and
   (C) at least one compound A selected from the group consisting of a compound represented by the formula (I):

(I)

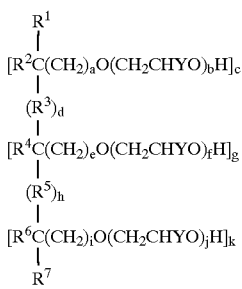

wherein each of $R^1$, $R^2$, $R^4$, $R^6$ and $R^7$ is independently a hydrogen atom, —$C_lH_{2l+1}$, or $C_nH_{2n}O(CH_2CHYO)_mH$, wherein Y is a hydrogen atom or methyl group, m is a number of 0 to 20, and n is an integer of 1 to 6; each of $R^3$ and $R^5$ is independently a hetero atom, —$C_nH_{2n}$—, wherein n is as defined above, or a divalent hydrocarbon group which may have a heteroatom; each of a, e and i is independently 0 or 1; each of b, f and j is independently a number of 0 to 30; each of c, g, and k is independently an integer of 1 to 5; and each of d and h is independently 0 or 1, with the proviso that the total number of —$CH_2CHYO$— units per molecule is 6 to 80, and a compound represented by the formula (III):

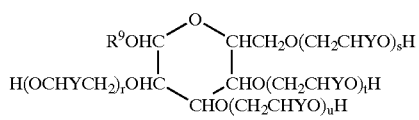

(III)

wherein $R^9$ is a hydrogen atom or —$C_qH_{2q+1}$, wherein q is an integer of 0 to 4; Y is as defined above; each of r, s, t and u is independently a number of 0 to 30, with the proviso that the total number of —$CH_2CHYO$— units per molecule is 6 to 80.

18. The water-based ink composition according to claim 17, wherein the compound A has a surface tension of 40 to 70 mN/m.

19. The water-based ink composition according to claim 17, wherein the content of compound A is 0.1 to 50% by weight.

20. The water-based ink composition according to claim 17, wherein the water-based ink composition further comprises at least one compound B selected from the group consisting of a compound represented by the formula (IV):

$$R^{10}O-(CH_2CHYO)_v-H \qquad (IV)$$

wherein Y is as defined above; $R^{10}$ is a hydrogen atom, or a saturated or an unsaturated monovalent hydrocarbon group having 1 to 8 carbon atoms which may have a hetero atom; and v is a number of 1 to 100, a compound represented by the formula (V):

$$H(OCHYCH_2)_w-O-R^{11}O-(CH_2CHYO)_x-H \qquad (V)$$

wherein Y is as defined above; $R^{11}$ is $C_yH_{2y+1}$ or a saturated or an unsaturated divalent hydrocarbon group having 3 to 10 carbon atoms which may have a hetero atom, wherein y is an integer of 3 to 10; and each of w and x is independently a number of 1 to 99, with the proviso that the total number of —$CH_2CHYO$— units per molecule is 2 to 100, and a compound represented by the formula (VI):

$$R^{12}-(OCHYCH_2)_w-O-R^{11}O-(CH_2CHYO)_x-H \qquad (VI)$$

wherein $R^{11}$, Y, w and x are as defined above; and $R^{12}$ is a saturated or an unsaturated monovalent hydrocarbon group having 1 to 8 carbon atoms which may have a hetero atom, with the proviso that the total number of —$CH_2CHYO$— units per molecule is 1 to 100.

21. The water-based ink composition according to claim 17, wherein the compound B has a surface tension of 40 to 70 mN/m.

22. The water-based ink composition according to claim 18, wherein the content of compound B is 0.1 to 50% by weight.

* * * * *